(12) United States Patent
Hemmady

(10) Patent No.: US 6,781,996 B1
(45) Date of Patent: Aug. 24, 2004

(54) SYSTEM AND METHOD IN AN ATM SWITCH FOR DYNAMICALLY ROUTING DATA CELLS USING QUALITY OF SERVICE DATA

(75) Inventor: Ajit G. Hemmady, Plano, TX (US)

(73) Assignee: Samsung Electronics Co., Ltd., Suwon-City (KR)

( * ) Notice: Subject to any disclaimer, the term of this patent is extended or adjusted under 35 U.S.C. 154(b) by 0 days.

(21) Appl. No.: 09/061,430

(22) Filed: Apr. 16, 1998

(51) Int. Cl.[7] .............................................. H04L 12/56
(52) U.S. Cl. .................................. 370/395.21; 370/400
(58) Field of Search ................................ 370/395, 400, 370/351, 238, 252, 230, 229, 235, 236.2, 237, 253, 395.21, 395.3, 395.4, 395.41, 395.43, 401, 408

(56) References Cited

U.S. PATENT DOCUMENTS

| | | | | |
|---|---|---|---|---|
| 5,233,604 A | * | 8/1993 | Ahamdi et al. | 370/400 |
| 5,933,425 A | * | 8/1999 | Iwata | 370/351 |
| 5,953,338 A | * | 9/1999 | Ma et al. | 370/395 |
| 5,995,503 A | * | 11/1999 | Crawley et al. | 370/351 |
| 6,041,307 A | * | 3/2000 | Ahuja et al. | 705/8 |
| 6,094,687 A | * | 7/2000 | Drake, Jr. et al. | 709/241 |

OTHER PUBLICATIONS

*The ATM Forum Technical Committee*, "ATM User–Network Interface (UNI) Signalling Specification", Version 4.0, Chapt. 9, Ref. No. af–sig–0061.000, Jul. 1996.

*The ATM Forum Technical Committee*, "Traffic Management Specification", Version 4.0, Chapt. 3, Ref. No. af–tm–0056.000, Apr. 1996.

*The ATM Forum Technical Committee*, "Private Network–Network Interface Specification Version 1.0", pp. 198–201, PNNI 1.0, Ref. No. af–pnni–0055.000 Letter Ballot, Mar. 1996.

* cited by examiner

*Primary Examiner*—Dang Ton
*Assistant Examiner*—Phuc Tran

(57) ABSTRACT

There is disclosed an ATM switch, for use in a switching network, comprising: 1) a plurality of input ports capable of receiving ATM cells from user nodes and from adjoining ATM switches in the switching network; 2) a plurality of output ports capable of sending ATM cells to user nodes and to the adjoining ATM switches in the switching network; 3) a database capable of storing at least one of quality of service (QoS) data and congestion level data received from the adjoining ATM switches; and 4) a route selection controller capable of transferring a selected received ATM cell from a first of the input ports to a selected one of the output ports in response to the QoS data stored in the database. The ATM switch uses relevant QoS and congestion data from its adjoining switches to determine in advance of establishing a connection which of the available ports on the adjoining switches meet the QoS requirements of the end-user.

20 Claims, 5 Drawing Sheets

| CELL BYTE NUMBER | VALUE RANGE | MEANING |
|---|---|---|
| 0 THRU 4 | PER ATM STANDARDS | CELL HEADER |
| 5 AND 6 | 0 - 65535 | TRANSMITTING SWITCH IDENTITY |
| 7 AND 8 | 0 - 65535 | PORT IDENTITY |
| 9 | 0 - 255 | PCR BUFFER CONGESTION LEVEL |
| 10 | 0 - 255 | SCR BUFFER CONGESTION LEVEL |
| 11 | 0 - 255 | MBS BUFFER SIZE 1 CONGESTION LEVEL |
| 12 | 0 - 255 | MBS BUFFER SIZE 2 CONGESTION LEVEL |
| 13 | 0 - 255 | MBS BUFFER SIZE 3 CONGESTION LEVEL |
| 14 | 0 - 255 | MBS BUFFER SIZE 4 CONGESTION LEVEL |
| 15 | 0 - 255 | MBS BUFFER SIZE 5 CONGESTION LEVEL |
| 16 AND 17 | 0 - 65535 | CIF/TBE BUFFER SPACE AVAILABLE |
| 18 | 0 - 255 | CURRENT CDV = 0 OR (1 TO 255) X 10 MICROSECONDS |
| 19 | 0 - 255 | CURRENT CBR CTD = 0 OR (1 TO 255) X 10 MICROSEC. |
| 20 | 0 - 255 | CURRENT RTVBR CTD = 0 OR (1 TO 255) X 10 MICROSEC. |
| 21 | 0 - 255 | CURRENT NRTVBR CTD = 0 TO (1 TO 255) X 10 MICROSEC. |
| 22 | 0% - 100% | CURRENT CLR FOR CBR |
| 23 | 0% - 100% | CURRENT CLR FOR RTVBR |
| 24 | 0% - 100% | CURRENT CLR FOR NRTVBR |
| 25 THRU 52 | NOT USED | RESERVED FOR FUTURE USE |

SYSTEM AND METHOD IN AN ATM SWITCH FOR DYNAMICALLY ROUTING DATA CELLS USING QUALITY OF SERVICE DATA

CROSS-REFERENCE TO RELATED APPLICATIONS

The present invention is related to that disclosed in U.S. patent application Ser. No. 09/061,696, entitled "SYSTEM AND METHOD FOR ROUTING DATA CELLS THROUGH AN ATM ARCHITECTURE USING QUALITY OF SERVICE DATA IN A SERVICE CONTROL POINT" and filed concurrently herewith. U.S. patent application Ser. No. 09/061,696 is commonly assigned with the present invention and is incorporated herein by reference for all purposes.

TECHNICAL FIELD OF THE INVENTION

The present invention is directed, in general, to switching devices and, more specifically, to an ATM switch that uses measured quality of service data from other ATM switches to route data cells.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

The increased popularity of LANs has led, in turn, to the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. The increased popularity of LANs has also led to an increase in the number of applications requiring very high-speed data transmission. Applications such as video conferencing require a large amount of bandwidth to transfer data and are relatively intolerant of switching delays.

The need for higher speed communication protocols that are less susceptible to switching delays has led to the development of the asynchronous transfer mode (ATM) telecommunications standard. ATM was originally intended as a service for the broadband public telephone network. Although designed primarily for the high-speed transfer of video and multimedia information, the most popular applications for ATM so far have been data transmission. ATM is widely used as the backbone of large business networks and in wide area networks.

ATM provides speeds from 50 Mbps up to 10 Gbps using fast packet switching technology for high performance. ATM uses small fixed-size packets, called "cells". A cell is a 53-byte packet comprising 5 bytes of header/descriptor information and a 48-byte payload of voice, data or video traffic. The header information contains routing tags and/or multi-cast group numbers that are used to configure switches in the ATM network path to deliver the cells to the final destination.

Many packet switching architectures have been developed for implementation in ATM networks. One such architecture, known as multistage interconnection network (MIN), comprises a switching fabric that routes packets received from one of N input ports to one or more of N output ports. The multistage interconnection network comprises groups of switching elements arranged in multiple stages. Each stage uses one or more bits in the packet (or cell) header to select the output to which the input packet is routed. This type of routing is known as "self-routing".

Customer demand for additional bandwidth beyond the capabilities of frame relay and other technologies has led the majority of telecommunication carriers to offer ATM service to customers. ATM service has low latency and predictable throughput due to the small cell size and tremendous speed of ATM technology. This makes ATM service desirable in networks that handle a mixture of data types, such as voice and video. ATM applications include conventional data transfers, imaging, full-motion video, and multimedia.

One important feature of ATM service is the ability to establish specific Quality of Service (QoS) levels to meet each customer's needs. The QoS requirement is critical in delay-sensitive applications, such as real-time audio, real-time video, and, to a lesser extent, Internet telephony. In broadband connections, the QoS of an end-to-end connection is very important, especially for constant bit rate (CBR) and real-time variable bit rate (RT-VBR) traffic connections.

The path that an ATM cell takes through an ATM network may be determined by several different well-known route selection algorithms. Generally, these prior art route selection algorithms are based on "static" routing tables and do not take into account present resource (e.g., switch) congestion or certain critical QoS factors. In many cases, the route taken through the entire ATM network, or at least a significant portion of it, is selected by the source switch without giving consideration to dynamic traffic congestion levels and QoS conditions at intermediate switches along the path.

Protocols exist in the prior art that verify whether a connection already established by a route selection algorithm in a switch satisfies the end users QoS requirements. If the established connection does not meet the end-user's needs, the protocol causes the switch to terminate the connection. The route selection algorithm must then select another route and the QoS requirements must be re-verified. The prior art algorithms do not attempt to use QoS data/statistics in the initial selection of a route through an ATM network.

There is therefore a need in the art for an improved ATM switch architecture capable of selecting an optimal route through an ATM network on the first connection attempt. In particular, there is a need for an improved ATM switch architecture that uses relevant QoS data to select an optimal route through an ATM network on the first connection attempt. There is a still further need for an improved ATM switch architecture that uses the most recent traffic congestion and QoS data to select an optimal route through an ATM network on the first connection attempt.

SUMMARY OF THE INVENTION

To address the above-discussed deficiencies of the prior art, it is a primary object of the present invention to improve the call/connection setup time of a switched virtual circuit (SVC) or a permanent virtual circuit (PVC) in an ATM network by using the most recent congestion data and quality of service (QoS) data within the ATM switches located in the ATM network. It is another object of the present invention to provide a deterministic method for selecting a route for a SVC or PVC in an ATM network that will satisfy the QoS requirements of an end user.

These objectives are met by means of a special purpose connection between adjoining ATM switches in an ATM network or between an ATM switch and a service control point (SCP) in an ATM network. This special purpose connection comprises a virtual channel circuit (VCC) connection that is established between adjoining ATM switches, or between an ATM switch and an SCP. The VCC connection is used to transfer to a recipient ATM switch selected traffic congestion data and selected QoS data about other ATM switches, such as, for example, the sending ATM switch.

Accordingly, in an advantageous embodiment of the present invention, there is provided, for use in a switching network, an asynchronous transfer mode (ATM) switch comprising: 1) a plurality of input ports capable of receiving ATM cells from user nodes and from adjoining ATM switches in the switching network; 2) a plurality of output ports capable of sending ATM cells to user nodes and to the adjoining ATM switches in the switching network; 3) a database capable of storing at least one of quality of service (QoS) data and congestion level data received from the adjoining ATM switches; and 4) a route selection controller capable of transferring a selected received ATM cell from a first of the input ports to a selected one of the output ports in response to the QoS data stored in the database.

In one embodiment of the present invention, at least one of the received QoS data and congestion level data is associated with a specific port on one of the adjoining ATM switches.

In another embodiment of the present invention, the ATM switch is capable of detecting QoS cells containing QoS data and congestion level data received from the adjoining ATM switches.

In still another embodiment of the present invention, the ATM switch further comprises a monitoring device for determining at least one of QoS data and congestion level data associated with the ATM switch.

In a further embodiment of the present invention, the ATM switch creates a QoS cell containing at least one of the QoS data and the congestion level data determined by the monitoring device.

In yet another embodiment of the present invention, the ATM switch transfers the QoS cell to at least one of the adjoining switches.

In a still further embodiment of the present invention, the ATM switch further comprises a switch fabric capable of transferring received ATM cells from the input ports to the output ports.

According to yet another embodiment of the present invention, the route selection controller selects the selected output if at least one of the stored QoS data and the congestion level data associated with a specific remote port on an adjoining ATM switch coupled to the selected output port compares favorably with a QoS requirement associated with the selected received ATM cell.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3 is a block diagram depicting in greater detail QoS data and traffic congestion data in the cell payload of the exemplary QoS cell 200 depicted in FIG. 2, according to one embodiment of the present invention;

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
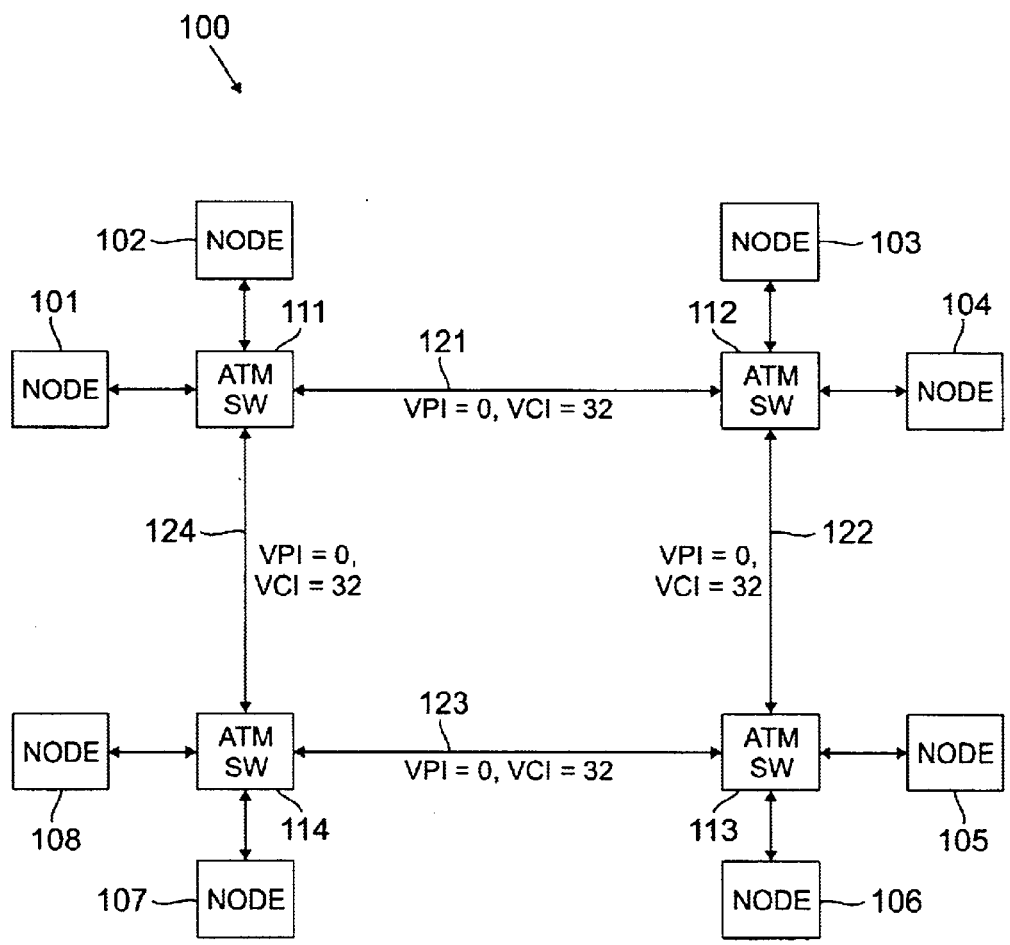
FIG. 1 illustrates an exemplary ATM switch architecture 100 according to one embodiment of the present invention.

FIG. 1 illustrates an exemplary ATM switch architecture 100 according to one embodiment of the present invention. ATM switch architecture 100 comprises four ATM switches 111–114, which are interconnected by network links 121–124. ATM cell packets are transferred bidirectionally between ATM switch 111 and ATM switch 112 across network link 121; between ATM switch 112 and ATM switch 113 across network link 122; between ATM switch 113 and ATM switch 114 across network link 123; and between ATM switch 114 and ATM switch 111 across network link 124.

In the exemplary ATM switch architecture 100 in FIG. 1, network nodes 101–108 are coupled to, and exchange data via, ATM switches 111–114. For example, node 102 may communicate bidirectionally with node 106 via ATM switches 111, 112, and 113. Alternatively, node 102 may communicate bidirectionally with node 106 via ATM switches 111, 114, and 113. Network nodes 101–108 may comprise end-user processing devices, such as desktop personal computers (PCs), printers' network servers, telephones, video conferencing equipment, and the like. Network nodes 101–108 may also comprise additional data transfer devices, such as other ATM switches, or network routers, and bridges.

Each of ATM switches 111, 112, 113, and 114 establishes a virtual channel circuit (VCC) connection with each of its adjoining switches in order to exchange traffic congestion data and specific QoS information. Each "special purpose" VCC connection uses a virtual path identifier (VPI)=0 and a virtual channel identifier (VCI)=32. For example, ATM switch 111 exchanges traffic congestion data and QoS data with adjoining switch 112 using a first VCC connection on link 121 having VPI=0, VCI=32 and with adjoining switch 114 using a second VCC connection on link 124 having VPI=0, VCI=32.

ATM switch 111 creates special purpose "QoS cells" for each port on ATM switch 111. The QoS cells are used to send traffic congestion data and QoS data pertaining to ATM switch 111 to ATM switches 112 and 114. The QoS cells are sent to adjoining ATM switches 112 and 114 once every M seconds, where M is a switch configurable parameter. ATM switch 112 also sends its own QoS cells containing QoS data and traffic congestion data pertaining to ATM switch 112 to ATM switch 111 (and ATM switch 113) once every N seconds, where N is a switch configurable parameter. Likewise, ATM switch 113 sends QoS cells containing QoS data and traffic congestion data pertaining to ATM switch 113 to ATM switch 112 (and ATM switch 114) once every P seconds, where P is a switch configurable parameter. Finally, ATM switch 114 sends QoS cells containing QoS data and traffic congestion data pertaining to ATM switch 114 to ATM switch 111 (and ATM switch 113) once every Q seconds, where Q is a switch configurable parameter. In the above example, the values of M, N, P and Q are independent. Hence, two or more may be equal, or none may be equal.

Each of ATM switches 111–114 maintains a database containing the QoS data and traffic congestion data of the ATM switches adjoining it. The database may be updated every time a QoS cell is received from an adjoining switch, or may be updated less frequently, according to the configuration of the receiving ATM switch.

When a voice call, for example, comes into ATM switch 111 from node 101 and is directed to node 106, during the call setup time ATM switch 111 determines the possible routing choices based on the network configuration and its routing database. The choices are based on availability of the trunk facilities (i.e., network links 121–124) between ATM switch 111 and the adjoining STM switches 112 and 114, and the destination dialed (i.e., node 106). If multiple choices are available to route the call, ATM switch 111 examines the traffic congestion data and QoS data for adjoining switches 112 and 114 that is stored in the database in ATM switch 111.

The call request also specifies the connection type for which the customer has contractually subscribed. The connection type, or ATM Traffic Category (ATC), may include real-time variable bit rate, non-real-time variable bit rate, available bit rate, constant bit rate, and the like. Based on the requested connection type, ATM switch 111 decides which of the multiple available routes (through ATM switch 112 or through ATM switch 114) is the optimal route at that instant of time. After the optimal route is selected, ATM switch 111 continues to examine the traffic congestion data and QoS data in newly arrived QoS cells from ATM switch 112 and ATM switch 114 in order to ensure that the route has adequate bandwidth and that the route satisfies the contractually specified customer QoS requirements, such as peak-to-peak cell delay variation (CDV), cell transfer delay, and cell loss rate, that were originally requested by node 101. Since each of ATM switches 111–114 follows this procedure, the amount of time required to select a route and establish the call connection is minimized. There is also a comparatively high probability that the connection selected will satisfy the customer's contractual QoS and traffic congestion requirements.

Figure 2:
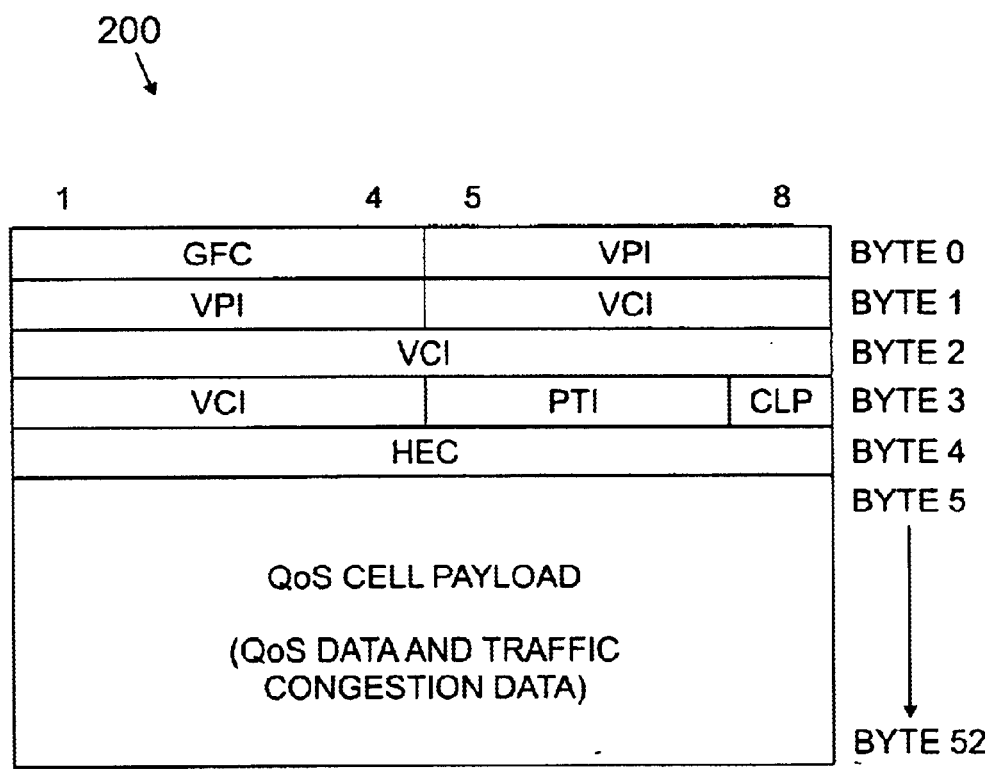
FIG. 2 is a block diagram of an ATM cell header in an exemplary QoS cell 200 according to one embodiment of the present invention.

FIG. 2 is a block diagram of an ATM cell header in an exemplary QoS cell 200 according to one embodiment of the present invention. QoS cell 200 comprises fifty-three (53) eight-bit bytes: five (5) bytes of header information (Bytes 0–4) and a forty-eight (48) byte cell payload (Bytes 5–53). The header comprises a four (4) bit general flow control (GFC) field, an eight (8) bit virtual path identifier (VPI) field, a sixteen (16) bit virtual channel identifier (VCI) field, a three (3) bit payload type indicator (PTI) field, a cell loss priority (CLP) bit, and an eight (8) bit header error control (HEC) field.

The GFC field is used to provide local functions, such as flow control, and generally has only local significance within an ATM network. The VPI field and the VCI field combine to identify a connection on an ATM network. The VPI field identifies a selected virtual path, which is a collection of virtual channels connecting two points in an ATM network. All of the ATM cells of a virtual path follow the same path through the network that was established during call set-up. The VCI field identifies a particular virtual circuit (virtual channel) which the ATM cells traverse from transmitting node to target node. A virtual circuit is a communications link for voice or data that appears to the transmitting and receiving nodes to be a dedicated point-to-point circuit. It is a logical path, rather than a physical path, for a call.

The PTI field is a value that indicates whether the ATM cell carries network management information or end-user information. For example, the PTI field of a resource management cell may have a binary value of '110', and the PTI field of an end-to-end Operations, Administration and Maintenance (OAM) flow cell may have a binary value '101'.

The CLP bit indicates one of two levels of priority for the ATM cell. If the CLP bit of an ATM cell has a binary value of '0', the ATM cell has a higher priority than an ATM cell having a binary value of '1'. Therefore, ATM cells having CLP bits=1 may be discarded first during periods of high traffic congestion in order to preserve the cell loss ratio (CLR) of ATM cells having CLP bits=1.

The HEC field is a cyclic redundancy check (CRC) code located in the fifth (last) byte of the ATM cell header. The ATM switches 111–114 may check for an error and, in some cases, correct a detected error. In most cases, an error checking algorithm is used that can detect and correct a single bit error in the header and/or can detect a multi-bit error in the header.

FIG. 3 is a block diagram depicting in greater detail QoS data and traffic congestion data in the cell payload of the exemplary QoS cell 200 depicted in FIG. 2, according to one embodiment of the present invention. QoS cell 200 is used to transfer traffic congestion data and QoS data from a selected ATM switch to its adjoining ATM switches.

The following table defines the abbreviations that appear in the block diagram of QoS cell 200 in FIG. 3:

| TABLE OF ABBREVIATIONS | |
|---|---|
| CBR | Constant Bit Rate |
| CDV | Peak-to-Peak Cell Delay Variation |
| CIF | Cells in Flight |
| CLR | Cell Loss Rate |
| CTD | Cell Transfer Delay |
| NRTVBR | Non-Real Time Variable Bit Rate |
| MBS | Maximum Burst Size |
| PCR | Peak Cell Rate |
| RTVBR | Real Time Variable Bit Rate |
| SCR | Sustained (Average) Cell Rate |
| TBE | Transient Buffer Expected |

Bytes 0–4 of QoS cell 200 are the cell header information shown above in FIG. 2. Bytes 5 and 6 of QoS cell 200 are the transmitting switch identity, that is, the ID of the ATM switch that is sending its own QoS cell to another ATM switch. A unique ID may be assigned to 65,536 different ATM switches. Bytes 7 and 8 of QoS cell 200 are the port identity, that is, the ID of the particular ATM switch port to which the QoS cell pertains, QoS data and congestion data is made available on a port-by-port basis for each ATM switch. Thus, a multiple port ATM switch transfers multiple QoS cells to each of its adjoining ATM switch(es).

Bytes 9 and 10 of QoS cell 200 are congestion level indicators for the peak cell rate (PCR) buffer and the sustained cell rate (SCR) buffer. PCR is typically used for constant bit rate traffic where the time delay is critical. SCR is used for real-time variable bit rate (RTVBR) traffic. Bytes 11–15 of QoS cell 200 are congestion level indicators for, in an exemplary switch architecture, five different maximum burst size (MBS) buffers. The different-sized MBS buffers are used for variable bit rate traffic where cells may be received in unexpectedly large bursts. Bytes 16 and 17 contain cells in flight (CIF) data and transient buffer expected (TBE) data, which are used in connection with available bit rate (ABR) traffic.

Some of the more important quality of service (QoS) parameters in ATM broadband technology are cell delay variation, cell loss rate and cell transfer delay. When a customer signs a service contract with an ATM service provider, the contract guarantees the customer, for example, a minimum bandwidth, such as 10 Mbps, a maximum cell transfer delay, a maximum cell delay-variation, and a maximum cell loss rate. If the ATM service provider does not meet these requirements, there typically are clauses that specify penalties, such as payment rebates for time periods when the customer's QoS requirements are not met.

Byte 18 of QoS cell 200 contains the cell delay variation (CDV) for the port associated with the QoS cell. The pattern and timing (i.e., spacing) of ATM cells on an output port of an ATM switch should be the same (ideally) as on the input port of the ATM switch. In reality, the cells generally are delayed by varying amounts as a result of buffering, processing, etc., within the ATM switch. Consequently, the spacing of the ATM cells vary as the ATM cells pass through the ATM switch. This variation is known as cell delay variation.

Bytes 19–21 of QoS cell 200 contain the cell transfer delay values for different types of traffic (CBR, RTVBR, and NRTVBR) for the port associated with the QoS cell. Cell transfer delay is amount of time that elapses between the time an ATM cell enters the ATM switch and the time the ATM cell exits the ATM switch. Bytes 22–24 of QoS cell 200 contain the cell loss rate values for different types of traffic (CBR, RTVBR, and NRTVBR) for the port associated with the QoS cell. Cell loss rate is given as a percentage of the total number of ATM cells received on a particular port.

Figure 4:
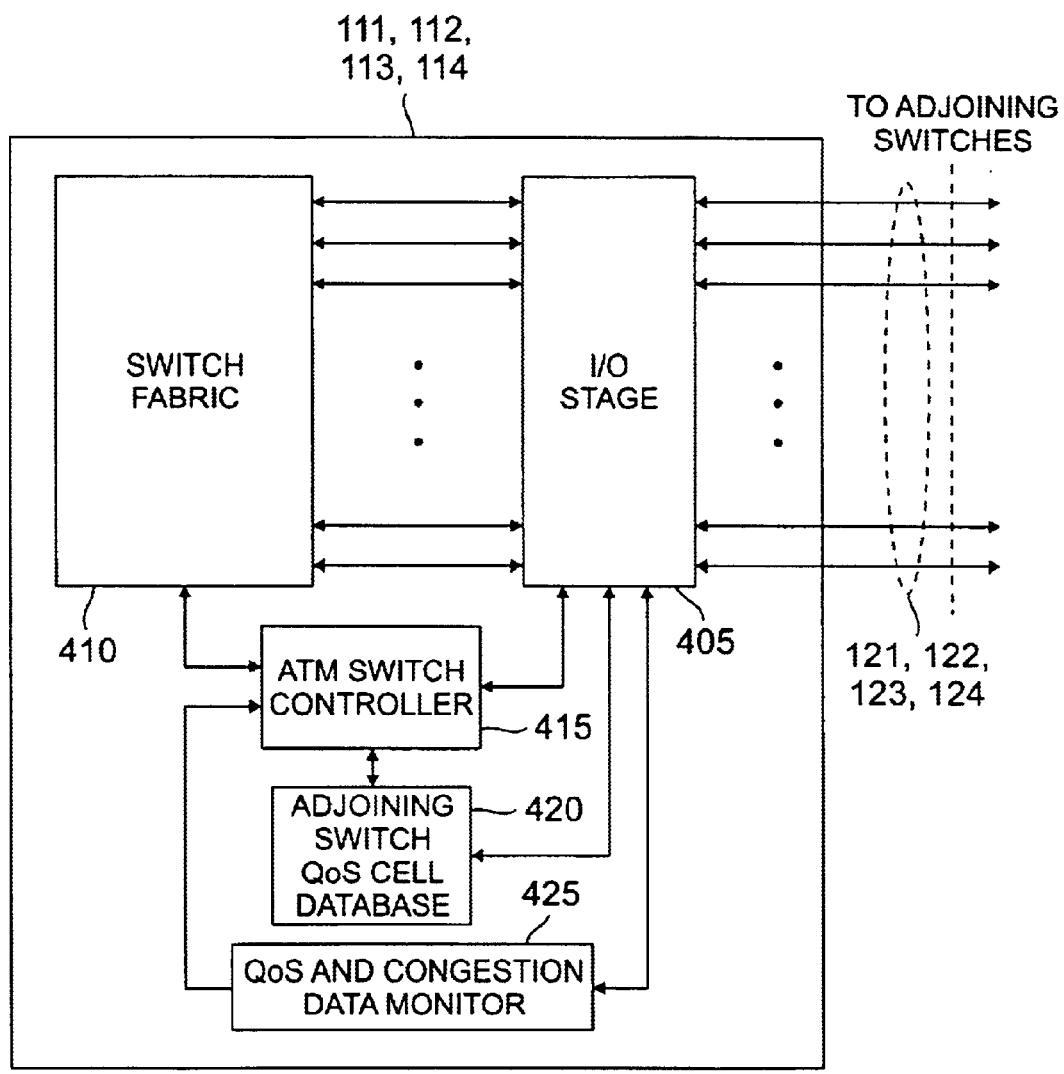
FIG. 4 is a block diagram illustrating an exemplary architecture for each of ATM switches 111–114 according to one embodiment of the present invention.

FIG. 4 is a block diagram illustrating an exemplary architecture for each of ATM switches 111–114 according to one embodiment of the present invention. ATM switches 111–114 comprise an input/output (I/O) stage 405 that includes I/O buffers, multiplexers, and address (cell header) decoders. I/O stage 405 receives ATM cells from adjoining switches on a plurality of trunk lines (i.e., network links 121–124) and transfers the received ATM cells to switch fabric 410. After the ATM cell header has been decoded, switch fabric 410 routes the ATM cell back to I/O stage 405, which outputs the ATM cell to the appropriate adjoining ATM switch.

The route selection for ATM cells received by each of ATM switches 111–114 is performed by ATM switch controller 415, which determines the switch positions within switch fabric 410 based on 1) the VPI and VCI fields within the ATM cell headers and 2) the QoS data and traffic congestion data of the adjoining switches, as explained below in greater detail. The relevant cell header information decoded by I/O stage 405 is sent to ATM switch controller 415. The QoS cells for adjoining switches are detected in I/O stage 405 by decoding ATM cells having a binary value "00000" in the VPI field and a binary value "11111" (i.e., 32 decimal) in the VCI field. The QoS cell payloads received by each of ATM switches 111–114 from the corresponding adjoining switches are stored in-adjoining switch QoS cell database 420. The QoS cell payloads stored in QoS cell database 420 are used by ATM switch controller 415 to establish connection paths for future ATM cells by selecting switch positions within switch fabric 410 and by selecting multiplexer channels within I/O stage 405.

Each one of ATM switches 111–114 also contains a QoS and congestion data monitor 425, which measures and records appropriate ATM cell traffic loads and delay time data as ATM cells are received and/or transmitted by I/O stage 405. QoS and congestion data monitor 425 includes suitably arranged counters and clocks for determining relevant data bit rates, data burst sizes, cell delay times, and the like. The QoS data and traffic congestion data captured by QoS and congestion data monitor 425 are transferred to ATM switch controller 415, which may perform additional calculations to derive statistical parameters, such as time delay variation(s), average ATM cell rates, ATM cell loss rate(s), and the like. ATM switch controller 415 then generates a QoS cell for each port on the particular one of ATM switches 111–114 in which it resides. These QoS cells are then periodically transferred to adjoining ones of ATM switches 111–114, according to the configuration of ATM switch controller 415.

Figure 5:
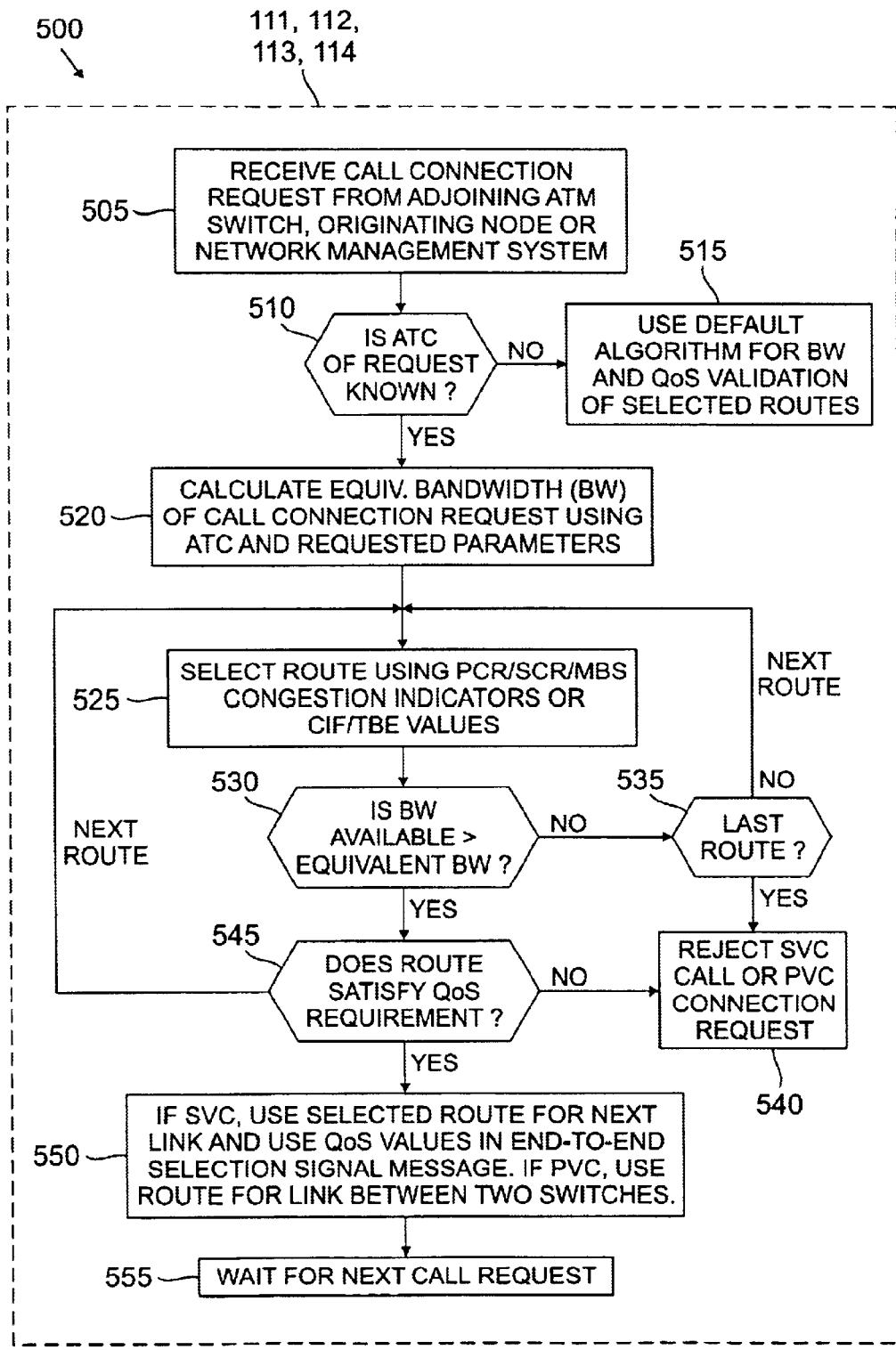
FIG. 5 is a flow diagram illustrating a route selection algorithm for validating bandwidth availability and QoS requirement suitability of ATM switch routes according to one embodiment of the present invention.

FIG. 5 is a flow diagram 500 illustrating a route selection algorithm for validating bandwidth availability and QoS requirement compatibility of ATM switch routes according to one embodiment of the present invention. The route selection process is initiated when one of ATM switches 111–114 receives a call request from an adjoining ATM switch, from one of nodes 101–106 (process step 505) or from, for example, a network management system. Network management systems are well known in the art and may be used to monitor, control and manage ATM switch architecture 100. One of the primary responsibilities of a network management server is to establish permanent virtual circuit (PVC) connections in ATM switch architecture 100.

The ATM switch receiving the call request determines if the requested ATM Traffic Category (ATC) is known (process step 510). If the requested ATC is not known, the ATM switch uses the default algorithm for bandwidth and QoS data validation for the selected routes (process step 515).

If the ATC of the call request is known, ATM switch controller 415 calculates the equivalent bandwidth of the call request using the ATC and the requested parameters (process step 520). Next, the ATM switch selects a port from the available ports based on the peak cell rate (PCR), sustained cell rate (SCR) and maximum burst size (MBS) values for that port stored in the adjoining switch QoS cell database 420. In the case of available bit rate (ABR) traffic, the ATM switch may select the port using the cells in flight (CIF) and transient buffer expected (TBE) values in the adjoining switch QoS cell database 420 (process step 525).

After a port has been selected, the ATM switch determines if the bandwidth available on the selected port is greater than the equivalent bandwidth calculated by ATM switch controller 415 (process step 530). If the bandwidth available is less than the equivalent bandwidth calculated by ATM switch controller 415, the ATM switch determines if the selected port is the last available port (process step 535). If the selected port is not the last available port, the ATM switch selects another port as explained above in process step 525. If the selected port is the last available port, the ATM switch rejects the switched virtual circuit or permanent virtual circuit connection request that was received in process step 505 from the adjoining ATM switch or originating node (process step 540).

However, if the bandwidth available on the selected port is greater than the equivalent bandwidth calculated by ATM switch controller 415 in process step 520, the ATM switch determines if the selected port satisfies the QoS requirements received in the call request from the adjoining ATM switch or originating node (process step 545). If the selected port does not satisfy the QoS requirements, the ATM switch selects the next available port (return to step 525).

If the selected port does satisfy the QoS requirements for the call request, the ATM switch determines if the call request is a switched virtual circuit or a permanent virtual circuit. If the call request is for a switched virtual circuit, the ATM switch uses the selected route for the next link and uses the QoS values associated with the call request as part of the end-to-end selection signaling message. If the call request is for a permanent virtual circuit, the ATM switch uses the selected port as a permanent link between the ATM switch and the adjoining ATM switch (process step 550). When the connection is finally established, the ATM switch then waits for the next call request to be received from an adjoining ATM switch or an originating node (process step 555).

More generally, conventional communications principles and theories are discussed in *The Irwin Handbook of Telecommunications*, by James Harry Green, Irwin Professional Publishing (2nd ed. 1992); *Data Communications Principles*, by R. D. Gitlin, J. F. Hayes and S. B. Weinstein, Plenum Press (1992); *Data Network Design*, by Darren L. Spohn, McGraw-Hill, Inc. (1993); *Optical Fiber Telecommunications II*, Stewart E. Miller and Ivan P. Kaminow, Academic Press (1988); *Integrated Optoelectronics*, by Mario Dagenais, Robert F. Leheny and John Crow, Academic Press (1995); *Voice and Data Communications Handbook*, by Bud Bates and Donald Gregory, McGraw-Hill, Inc. (1996); and *Newton's Telecom Dictionary*, by Harry Newton, Miller Freeman, Inc. ($13^{th}$ Ed. 1998). In particular, ATM technology is discussed in detail in *ISDN and Broadband ISDN with Frame Relay and ATM*, by William Stallings, Prentice Hall ($3^{rd}$ Ed. 1995). Each of the foregoing publications is incorporated herein by reference for all purposes as if fully set forth herein.

Although the present invention has been described in detail, those skilled in the art should understand that they can make various changes, substitutions and alterations herein without departing from the spirit and scope of the invention in its broadest form.

What is claimed is:

1. For use in a switching network, an asynchronous transfer mode (ATM) switch comprising:
   a plurality of input ports capable of receiving ATM cells, from user nodes and from adjoining ATM switches in said switching network;
   a plurality of output ports capable of sending ATM cells to user nodes and to said adjoining ATM switches in said switching network;
   a database capable of storing at least one of quality of service (QoS) data and congestion level data received from said adjoining ATM switches;
   a route selection controller capable of transferring a selected received ATM cell from a first of said input ports to a selected one of said output ports in response to said at least one of QoS data and congestion level data stored in said database; and
   a monitoring device for determining at least one of QoS data and congestion level data associated with said ATM switch, wherein the ATM switch is capable of creating a QoS cell containing at least one of the QoS data and the congestion level data and transferring the QoS cell only to each of the adjoining ATM switches.

2. The asynchronous transfer mode (ATM) switch set forth in claim 1 wherein in at least one of said received QoS data and said received congestion level data is associated with a specific port on one of said adjoining ATM switches.

3. The asynchronous transfer mode (ATM) switch set forth in claim 1 wherein said ATM switch is capable of detecting QoS cells containing at least one of QoS data and congestion level data received from said adjoining ATM switches.

4. The asynchronous transfer mode (ATM) switch set forth in claim 1 further comprising a switch fabric capable of transferring received ATM cells from said input ports to said output ports.

5. The asynchronous transfer mode (ATM) switch set forth in claim 1 wherein said route selection controller selects said selected output if at least one of said stored QoS data and said stored congestion level data associated with a specific remote port on one of the adjoining ATM switches coupled to said selected output port compares favorably with a QoS requirement associated with said selected received ATM cell.

6. The ATM switch of claim 1, wherein the QoS cell is transferred to each of the adjoining switches over virtual channel circuits, each of the virtual channel circuits having a common virtual path identifier and a common virtual channel identifier.

7. An asynchronous transfer mode (ATM) network infrastructure comprising:
   a plurality of nodes capable of transmitting and receiving ATM cells; and a plurality of ATM switches for transferring said ATM cells between said nodes, at least two of said ATM switches comprising:
- a plurality of input ports capable of receiving ATM cells from user nodes and from adjoining ATM switches in said switching network;
- a plurality of output ports capable of sending ATM cells to user nodes and to said adjoining ATM switches in said switching network;
- a database capable of storing at least one of quality of service (QoS) data and congestion level data received from said adjoining ATM switches;
- a route selection controller capable of transferring a selected received ATM cell from a first of said input ports to a selected one of said output ports in response to said QoS data stored in said database; and
- a monitoring device for determining at least one of QoS data and congestion level data associated with said ATM switch, wherein the ATM switch is capable of creating QoS cells containing at least one of the QoS data and the congestion level data and transferring the QoS cells to at least one of the adjoining ATM switches;

wherein the route selection controller in a first of the ATM switches is capable of transferring one of the QoS cells to at least one of the adjoining ATM switches once during every first interval of time, the route selection controller in a second of the ATM switches is capable of transferring one of the QoS cells to at least one of the adjoining ATM switches once during every second interval of time, and the first interval of time is different from the second interval of time.

8. The ATM network infrastructure set forth in claim 7 wherein in at least one of said received QoS data and received congestion level data is associated with a specific port on one of said adjoining ATM switches.

9. The ATM network infrastructure set forth in claim 7 wherein said ATM switch is capable of detecting QoS cells containing at least one of QoS data and congestion level data received from said adjoining ATM switches.

10. The ATM network infrastructure set forth in claim 7 wherein said ATM switch creates a QoS cell containing at least one of said QoS data and said congestion level data determined by said monitoring device.

11. The ATM network infrastructure set forth in claim 10 wherein said ATM switch transfers said QoS cell to at least one of said adjoining switches.

12. The ATM network infrastructure set forth in claim 7 further comprising a switch fabric capable of transferring received ATM cells from said input ports to said output ports.

13. The ATM network infrastructure set forth in claim 7 wherein said route selection controller selects said selected output if at least one of stored QoS data and stored congestion level data associated with a specific remote port on one of the adjoining ATM switches coupled to said selected output port compares favorably with a QoS requirement associated with said selected received ATM cell.

14. The ATM network infrastructure of claim 7, wherein each of the ATM switches is capable of creating the QoS cells and transferring the QoS cells only to each of the adjoining ATM switches in the switching network.

15. The ATM network infrastructure of claim 14, wherein the ATM switches transfer the QoS cells to each other over virtual channel circuits, each of the virtual channel circuits having a common virtual path identifier and a common virtual channel identifier.

16. For use in an asynchronous transfer mode (ATM) switch having a plurality of input ports and a plurality of output ports, a method for routing ATM cells in an ATM switching network comprising the steps of:
- determining, with a monitoring device in said ATM switch, at least one of quality of service (QoS) data and congestion level data associated with said ATM switch;
- receiving on one or more input ports quality of service (QoS) data and congestion level data from adjoining ATM switches in the ATM switching network;
- storing the received QoS data and the received congestion level data in a QoS database;
- receiving an end-user ATM cell into the ATM switch;
- determining an end-user QoS requirement associated with the end-user ATM cell;
- comparing the end-user QoS requirement with one or more of the quality of service (QoS) data and congestion level data stored in the database;
- selecting one of the output ports of the ATM switch for use in sending the end-user ATM cell to a selected one of the adjoining ATM switches capable of meeting the end-user QoS requirements; and
- receiving and examining additional QoS data and congestion level data from the adjoining ATM switches to ensure that the end-user QoS requirements are satisfied using the selected output port.

17. The method set forth in claim 16 wherein at least one of the received QoS data and the received congestion level data is associated with a specific port on one of the adjoining ATM switches.

18. The method set forth in claim 16 including the further step of detecting QoS cells containing at least one of QoS data and congestion level data received from the adjoining ATM switches.

19. The method set forth in claim 16 including the further step of sending to one of the adjoining ATM switches a QoS cell containing at least one of QoS data and congestion level data associated with the ATM switch.

20. The method of claim 16, further comprising communicating at least one of the QoS data and the congestion level data determined by the monitoring device to at least two of the adjoining ATM switches over virtual channel circuits, each of the virtual channel circuits having a common virtual path identifier and a common virtual channel identifier.

* * * * *